Figure 1:
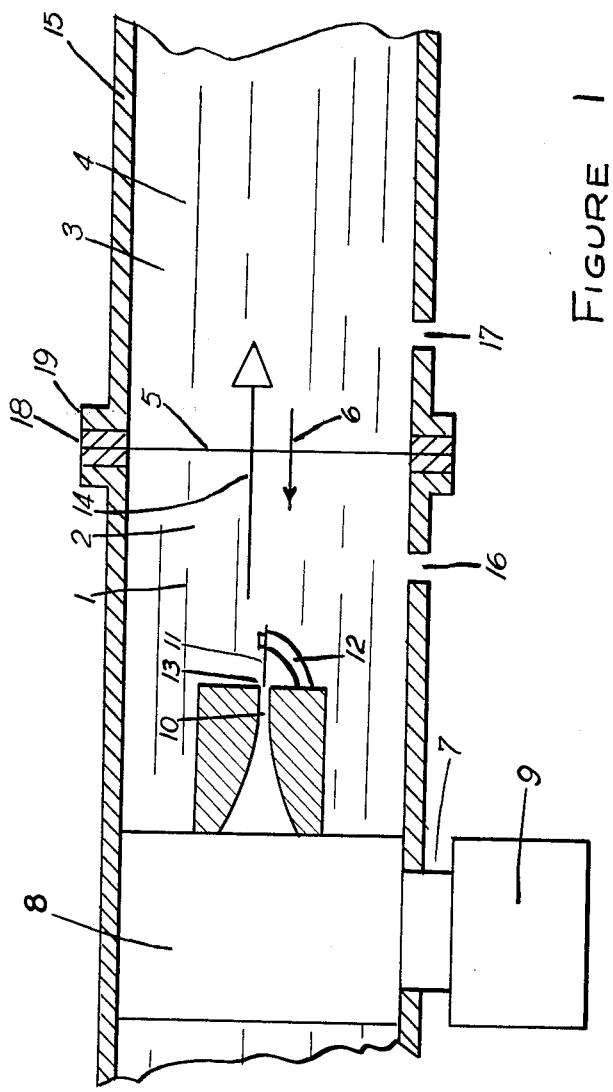

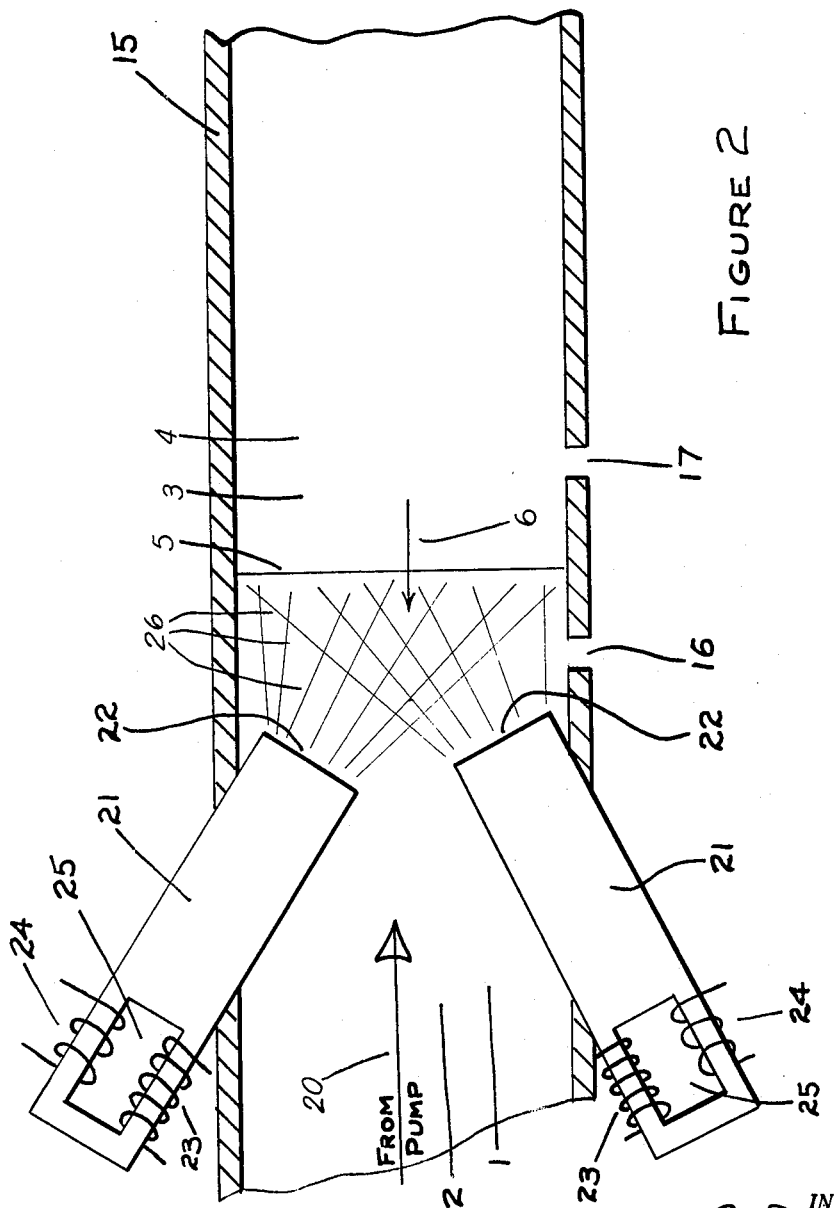

3,206,397
CAVITATIONAL REVERSE OSMOTIC SEPARATION OF WATER FROM SALINE SOLUTIONS
Richard F. Harvey, Pittsburgh, Pa., assignor to Metaltronics Inc., Pittsburgh, Pa.
Filed Sept. 10, 1962, Ser. No. 222,433
14 Claims. (Cl. 210—19)

This invention relates to a new and improved method of separating solvents from solutes in solution, and more specifically to a novel method of separating fresh water from salt water by reverse osmotic methods. The present invention involves cavitation to facilitate the passage of water through a suitable semi-permeable membrane in a reverse osmotic process, employing salt water in one cell and fresh water in another cell. The combination of high frequency vibrational energy and high pressure to oppose the natural osmotic pressure is the basis of the present invention. This provides a new concept in the important problem of separating fresh water from sea water at reasonable cost.

About one third of the earth's land surface, including over 60 underdeveloped countries, is arid and in short supply of water. There is a critical need for an entirely new process for economically separating fresh water from sea water and the present invention provides a basis for the solution to this important problem. In this connection the market for desalted water has been estimated by the Dept. of the Interior to be about 2 billion gallons per day by 1980 for the United States and world consumption figures will be much greater than this.

In general there are two basic methods of separation. We can either separate pure water from salt water leaving a concentrated salt residue or we can separate salt from salt water leaving relatively pure water.

The first method is substantially independent of the salt content and involves methods of separation such as distillation, freezing, etc. Of these methods only distillation is of commercial significance. An example of a method which involves separation of the salt from salt water is electrodialysis.

In general, presently used methods can effect separation of fresh water from salt water at costs ranging from about $1.50 to about $4.00 per 1000 gallons of fresh water produced whereas it is desired that this be reduced to below 75¢ per 1000 gallons of fresh water produced.

An excellent reference to the problems involved in conventional methods of separating fresh water from salt water is a book entitled "Desalinization Research and the Water Problem," Publication 941, National Academy of Sciences—National Research Council, Washington, D.C., 1962.

When a concentrated salt solution is separated from relatively pure water by a semi-permeable membrane, water will flow by osmotic pressure towards the concentrated salt solution. This merely results in dilution of the salt solution and no fresh water is produced.

The natural osmotic pressure can be calculated from the following formula and it can be shown that this will be about 25 atmospheres for sea water:

$$\pi = \frac{n}{v} RT$$

where:
$\pi$ = osmotic pressure in atmospheres
$v$ = volume of solution in liters
$n$ = number of moles, solute
$R$ = gas constant (0.082 liter atmosphere per degree)
$T$ = absolute temperature Reverse osmosis may be used to separate water in a system consisting of salt water in one cell separated by a semipermeable membrane from pure water in another cell. In reverse osmosis it is necessary to apply pressure to the salt water to exceed the natural osmotic pressure in order to drive water from the salt water cell towards the fresh water cell.

The present investigations confirm the experience of others with respect to the limitations of reverse osmotic processes as known to the prior art. However I find that high frequency vibration can be combined with high pressure in a novel and highly effective arrangement to provide a useful and economical method of separating fresh water from salt water.

I find that cavitation increases the flow of water through a semipermeable membrane to facilitate separation of the water from salt water in a reverse osmotic process. The cavitation may be produced by magnetostrictive or electrostrictive transducers or by mechanical gas or liquid driven generators. One embodiment includes a pump, a constricted passage, and a vibrating blade. The combination of the pump, the constricted opening, and the vibrating blade provides both cavitation in the liquid and high pressure to oppose and reverse the flow of water which would otherwise occur by natural osmotic pressure.

The basis of the present invention is, therefore, twofold. It involves, broadly, the use of high frequency vibration to produce cavitation to prevent clogging of the membrane and to substantially increase the flow of water through the semipermeable membrane in a reverse osmotic process.

Also the present invention teaches the use of high pressure means to cause a jet of salt water to impinge on a vibrating member to provide simultaneously conditions of high frequency vibration and cavitation in the liquid as well as high pressure to force water to flow through a semipermeable membrane from a salt solution to a fresh water cell.

An example of a satisfactory mechanical means of vibrating liquids to carry out the principles of the present invention, consists of a pump and a constricted opening to provide a liquid jet which impinges on a blade to cause it to vibrate as described in U.S. Patent 2,657,021.

High pressure gear pumps such as are presently available are capable of pressures up to about 1500 p.s.i. The blade may be caused to vibrate with a frequency of about 22 kc. The mechanical system including the pressure generating means, the constricted passage, and the vibrating blade may be thought of as an acoustic liquid whistle.

The frequency of vibration is not of critical importance and it is important that conditions of cavitation be produced for maximum effectiveness. In general satisfactory results can be obtained in the frequency range of about 1000 to about 1,000,000 cycles per second. However noise and economic considerations imply a narrower preferred frequency range.

In general cavitation can be produced more economically at the lower frequencies below about 10,000 cycles per second with electrostrictive and magnetostrictive transducers. Operation in the audible range, however, results in noise which is usually objectionable and a narrower preferred range from this standpoint may be stated to be about 15,000 to about 60,000 cycles per second.

In a cavitational reverse osmotic process the selection of the semipermeable membrane is very important. In order to withstand the severe requirements of cavitation and high pressure, we propose membranes of porous polyethylene and other cross linked polymers. Reinforcement with glass fibre or powdered metal appears to be desirable to strengthen the membrane. The essential properties of the membrane include permeability to the solvent but not to the solute. Also the membrane must be capable of withstanding the destructive effects of high pressure and cavitation.

The drawing FIGURE 1 illustrates schematically one embodiment of the separation of fresh water from sea water in a reverse osmotic process according to the teachings of the present invention.

In the drawing FIGURE 1 a salt water cell 1 containing sea water 2 with 35,000 p.p.m. of salt is separated from a fresh water cell 3 containing fresh water 4 by a semipermeable membrane 5. The natural osmotic pressure of about 25 atmospheres is illustrated by the small arrow 6.

Also provided to generate the high frequency vibration and to provide the pressure to oppose and to exceed the natural osmotic pressure 6 is an acoustic liquid whistle 7. This consists essentially of a pump 8, a motor 9 to drive the pump 8, a constricted passage 10, and a vibrating blade 11. The blade 11 is clamped on a holder 12 so that the edge 13 of the blade 11 is free to vibrate. The vibration of the edge 13 of the blade 11 provides the cavitation when the salt water 2 impinges on the blade edge 13. This facilitates the passage of fresh water 4 through the semipermeable membrane 5. The acoustic liquid whistle 7 also provides the pressure indicated by the arrow 14 to oppose and to exceed the natural osmotic pressure 6.

In the illustration FIGURE 1, the pump 8 develops about 1200 p.s.i. which is more than adequate to exceed the natural osmotic pressure represented by the arrow 6.

The blade 11 vibrates at about 22,000 cycles per second resulting in cavitation in the sea water 2.

The cells 1, 3 are enclosed in a housing 15. The arrangement of the pump 8, the constricted passage 10, and the blade 11 is such that the flow of sea water 2 impinges on the edge 13 of the blade 11 resulting in high frequency vibration of the blade edge 13 to cause cavitation in the sea water 2.

An outlet 16 is provided in the housing 15 in the salt water cell 1 to permit withdrawal of the concentrated sea water 2. Another outlet 17 is provided in the fresh water cell 3 to provide for withdrawal of fresh water 4. The semipermeable membrane 5 is provided with a rim 18 which is fastened to flanges 19 in the housing 15.

FIGURE 2 illustrates schematically the separation of fresh water from salt water in a reverse osmotic process employing a pump and ultrasonic transducers.

In FIGURE 2 a salt water cell 1 containing sea water 2 is separated from a fresh water cell 3 containing fresh water 4 by a semipermeable membrane 5.

The natural osmotic pressure of about 25 atmospheres is represented by the small arrow 6. The pressure to oppose and exceed the natural osmotic pressure represented by the small arrow 6 is provided by a pump which is not shown. However the pump pressure is illustrated by the large arrow 20.

The ultrasonic vibration to prevent clogging of the semipermeable membrane 5 is provided by several magnetostrictive transducers 21 whose faces 22 are disposed to focus vibration towards the semipermeable membrane 5.

The magnetostrictive transducers 21 preferably have broad radiating faces 22. The tranducers 21 include a polarizing coil 23 and an excitation coil 24 which are wound about the laminated nickel or nickel alloy core through the opening 25.

The pump, not illustrated, develops pressures illustrated by the large arrow 20 which is substantially in excess of and opposite in direction to the osmotic pressure represented by the small arrow 6. The acoustical energy represented by rays 26 are focused towards the semipermeable membrane 5 to prevent and to minimize clogging and to facilitate the flow of water 4 therethrough.

Outlets 16 and 17 are provided in the housing 15 to permit withdrawal of salt water 2 from the salt water cell 1 and fresh water 3 from the fresh water cell 4 respectively.

Multiple stage separation may be used on highly concentrated salt solutions and the weaker salt solutions may employ cells connected in parallel. It is indicated from energy considerations that the present invention involving cavitational reverse osmosis will result in a commercial cost of about 50¢ per 1000 gallons of fresh water produced.

Having described several specific embodiments of this invention, it will be understood that the invention may be otherwise embodied within the scope of the following claims:

I claim:

1. The process of separating solvents from solutes in solutions by reverse osmotic means which consists in the establishment of a cell containing the solution separated by a semipermeable membrane substantially permeable to the solvent but not the solute from another cell containing the solvent; imparting high frequency vibrational energy to the cell containing the solution; and imparting pressure to the cell containing the solution to exceed the natural osmotic pressure and to cause the solvent to flow from the cell containing the solution to the cell containing the solvent.

2. An improved reverse osmotic process for separating fresh water from salt water including a salt water cell separated from a fresh water cell by a suitable, reinforced semipermeable membrane permeable to water but not to salt; said process comprising the steps of subjecting the salt water to mechanically produced acoustic vibrations in or near the ultrasonic range, said mechanical means consisting in passing the salt water under pressure through a constricted opening to impinge on a blade which is capable of vibration with sufficient intensity to result in cavitation in the salt water; the said pressure imparted to the salt water being in excess of 25 atmospheres.

3. A reverse osmotic process for separating fresh water from salt water including a salt water cell separated from a fresh water cell by a semipermeable membrane permeable to water but not to salt, said process including the steps of imparting high frequency vibration to the salt water cell to cause intense sonic turbulence thereto to minimize clogging of the said membrane; and in subjecting the salt water cell to pressure to cause the fresh water to flow through the said membrane from the salt water cell to the fresh water cell, said pressure being in excess of the natural osmotic pressure which would cause water to flow from the fresh water cell to the salt water cell but said pressure being substantially less than the pressure required for the reverse osmotic separation of fresh water from salt water in the absence of vibration.

4. An improved reverse osmotic process for separating fresh water from salt water including a salt water cell separated from a fresh water cell by a semipermeable, polyethylene membrane; said process including the steps of imparting high frequency vibration to the salt water cell to cause intense sonic turbulence thereto; and in subjecting the salt water cell to pressure to cause the fresh water to flow through the said membrane from the salt water cell to the fresh water cell, said pressure being in excess of the natural osmotic pressure which would cause water to flow from the fresh water cell to the salt water cell, but said pressure being substantially less than the pressure required for the reverse osmotic separation of fresh water from salt water in the absence of vibration.

5. The process of separating solvents from solutes in solution which consists in the establishment of a cell containing the solution separated by a semipermeable membrane from another cell containing the solvent; said semipermeable membrane being permeable to the solvent but substantially impermeable to the solute; imparting high frequency vibration to the cell containing the solution; and in imparting pressure to the cell containing the solution, said pressure being in excess of the natural osmotic pressure of the said cell, to cause the solvent to flow from the cell containing the solution to the cell containing the solvent, and the said pressure being substantially less than the pressure required for the reverse osmotic separation of the solvent from the solution in the absence of vibration.

6. An improved reverse osmotic process for separating fresh water from saline solutions including a saline water cell separated from a fresh water cell by a semipermeable membrane, said membrane being substantially permeable to fresh water but not to salt; said process comprising the steps of imparting high frequency vibration to the saline solution to result in cavitation therein; imparting high pressure to the saline solution to substantially exceed the natural osmotic pressure, and to cause fresh water to flow from the saline water cell through the said membrane to the fresh water cell.

7. A reverse osmotic process for separating solvents from solutes in solution including a cell containing the solute in solution separated from a cell containing the solvent by a semipermeable membrane, said membrane being permeable to the solvent but not the solute; said process including the steps of imparting high frequency vibration to the cell containing the solute in solution to cause intense sonic turbulence thereto; and in subjecting the cell containing the solute in solution to pressure to cause the solvent to flow through the said membrane from the cell containing the solute in solution to the cell containing the solvent, said pressure being in excess of the natural osmotic pressure which would cause the solvent to flow from the cell containing the solvent to the cell containing the solute in solution, but said pressure being substantially less than the pressure required for the reverse osmotic separation of the solvent from the solute in solution in the absence of vibration.

8. An improved reverse osmotic process for separating fresh water from salt water including a salt water cell separated from a fresh water cell by a semipermeable membrane, permeable to water but not to salt; said process comprising the steps of subjecting the salt water to mechanically produced, high frequency vibrations, and in imparting high pressure to the salt water cell to oppose and exceed the natural osmotic pressure to force the fresh water to flow through the said membrane from the salt water cell to the fresh water cell.

9. An improved reverse osmotic process for separating fresh water from salt water by mechanical means including a salt water cell separated from a fresh water cell by a semipermeable membrane which is substantially permeable to water but not to salt; said process including the steps of subjecting the salt water to mechanically produced high frequency vibrations, said mechanical means consisting in passing the salt water under pressure through a constricted opening to impinge on a blade which is capable of vibration with sufficient intensity to result in cavitation in the salt water; the said pressure imparted to the salt water being substantially in excess of the natural osmotic pressure which would result in the flow of water from the fresh water cell to the salt water cell in the absence of an applied pressure to the said salt water cell.

10. An improved reverse osmotic process for separating fresh water from salt water containing up to about 35,000 p.p.m. of salt, including a salt water cell separated from a fresh water cell by a semipermeable membrane, said membrane being permeable to water but not to salt; said process comprising the steps of imparting high frequency vibration to the salt water cell in the frequency range of about 1000 to about 1,000,000 cycles per second to cause cavitation therein, and in subjecting the salt water cell to a pressure substantially in excess of the natural osmotic pressure to cause fresh water to flow from the salt water cell through the said membrane to the fresh water cell.

11. In an improved reverse osmotic process for separating fresh water from salt water including a salt water cell separated from a fresh water cell by a semipermeable membrane, permeable to water but not to salt; the step of applying high frequency vibration in the range of about 15,000 to about 60,000 cycles per second to the salt water in contact with the said membrane to facilitate passage of the fresh water therethrough.

12. An improved reverse osmotic process for separating fresh water from salt water including a salt water cell separated from a fresh water cell by a semipermeable membrane, permeable to water but not to salt; said process comprising the steps of imparting high frequency vibration to the salt water cell to cause intense sonic turbulence therein; and in subjecting the salt water cell to a pressure in excess of the natural osmotic pressure to cause fresh water to flow from the salt water cell through the said membrane to the fresh water cell.

13. An improved reverse osmotic process for separating fresh water from salt water including a salt water cell separated from a fresh water cell by a semipermeable membrane, permeable to water but substantially impermeable to salt; said process comprising the steps of imparting high frequency vibration in the range of about 1000 to about one million cycles per second to the salt water cell to cause intense sonic turbulence therein; and in subjecting the salt water cell to a pressure in excess of about 25 atmospheres to exceed the natural osmotic pressure and to cause fresh water to flow from the salt water cell through the said membrane to the fresh water cell.

14. An improved reverse osmotic process for separating fresh water from salt water including a salt water cell separated from a fresh water cell by a semipermeable, plastic membrane, permeable to water but not to salt, said process including the steps of imparting high frequency vibration at a frequency range of about 1000 to about 1,000,000 cycles per second to the salt water to cause intense sonic turbulence thereto; and in subjecting the salt water cell to pressure to cause fresh water to flow through the said membrane from the salt water cell to the fresh water cell, said pressure being in excess of the natural osmotic pressure which would cause water to flow from the fresh water cell to the salt water cell, but said pressure being substantially less than the pressure required for the reverse osmotic separation of fresh water from salt water in the absence of vibration.

References Cited by the Examiner
UNITED STATES PATENTS

| 2,828,231 | 3/58 | Henry | 134—1 |
| 3,056,698 | 10/62 | Kleesattle et al. | 134—1 |
| 3,068,829 | 12/62 | Nuissal | 134—1 |

OTHER REFERENCES

Fresh Water From The Ocean by Ellis (copyright 1954 by The Conversation Foundation, Inc.). Article: "Effects Accompanying The Air Bubbles" (pages 73–75, and 106 relied upon).

MORRIS O. WOLK, *Primary Examiner.*